United States Patent [19]

Nakamura et al.

[11] Patent Number: 5,086,741
[45] Date of Patent: Feb. 11, 1992

[54] METHOD AND APPARATUS FOR DETECTING AND CONTROLLING COMBUSTION CONDITION IN AN INTERNAL COMBUSTION ENGINE

[75] Inventors: Kenichi Nakamura, Katsuta; Yozo Nakamura, Ibaraki; Yuji Maeda; Masami Nagano, both of Katsuta; Yuzo Kadomukai, Ibaraki, all of Japan

[73] Assignee: Hitachi, Ltd., Tokyo, Japan

[21] Appl. No.: 568,086

[22] Filed: Aug. 16, 1990

[30] Foreign Application Priority Data

Aug. 25, 1989 [JP] Japan .................. 1-217364

[51] Int. Cl.$^5$ .................. F02P 5/15; F02D 41/04
[52] U.S. Cl. .................. 123/419; 123/436; 123/613
[58] Field of Search .................. 123/419, 425, 435, 436, 123/612, 613, 617; 73/35, 116, 517 R, 518; 324/161, 162

[56] References Cited

U.S. PATENT DOCUMENTS

| | | | |
|---|---|---|---|
| 4,691,286 | 9/1987 | Obayashi et al. | 123/419 X |
| 4,759,327 | 7/1988 | Nagano et al. | 123/419 |
| 4,773,381 | 9/1988 | Koshida | 123/613 X |
| 4,799,469 | 1/1989 | Nagano et al. | 123/419 X |
| 4,951,639 | 8/1990 | Iwata et al. | 123/613 |
| 4,953,532 | 9/1990 | Nagano et al. | 123/419 |

FOREIGN PATENT DOCUMENTS

| | | |
|---|---|---|
| 3403260 | 8/1984 | Fed. Rep. of Germany . |
| 3615547 | 11/1986 | Fed. Rep. of Germany . |
| 2301691 | 9/1976 | France . |
| 0051243 | 3/1983 | Japan .................. 123/419 |
| 2075590 | 11/1981 | United Kingdom .......... 123/419 |

Primary Examiner—Willis R. Wolfe
Attorney, Agent, or Firm—Antonelli, Terry Stout & Kraus

[57] ABSTRACT

A method of detecting the condition of combustion in each cylinder of an internal combustion engine while monitoring a variation in rotation of a crankshaft in the engine for each cylinder, in which the degree of irregular combustion is judged based on the magnitude of the rotational variation, and/or in which the condition of combustion in a succeeding cylinder is judged based on the difference between rotational variations within one combustion period, of adjacent cylinders, and/or in which the rotational ascending rate within one combustion period, of each cylinder is detected to judge the condition of combustion in the cylinder based on the dropping state of the rotational ascending rate, and/or in which the rotational angular acceleration within one combustion period, of each cylinder is detected to thereby judge that a predetermined cylinder is in a condition of irregular combustion when the quantity of the variation in rotational angular acceleration between adjacent cylinders exceeds a predetermined value.

17 Claims, 18 Drawing Sheets

NOTE : C IS A REFERENCE VALUE (CASE OF 4 CYLINDERS) 360°(CRANK ANGLE)

360°(CRANK ANGLE)

METHOD AND APPARATUS FOR DETECTING AND CONTROLLING COMBUSTION CONDITION IN AN INTERNAL COMBUSTION ENGINE

BACKGROUND OF THE INVENTION

The present invention relates to a novel method and apparatus for detecting the condition of combustion in an internal combustion engine and it relates to a crank angle sense to be used in the apparatus. Further, it relates to an internal engine control method and apparatus using the first-mentioned method and apparatus.

In a conventional apparatus, as described in Japanese Patent Unexamined Publication No. Sho-58-51243, the revolution speed of an internal combustion engine is detected at least two points within one ignition cycle from a preceding ignition point of time to a succeeding ignition point of time, the value of variation in the revolution speed within that one ignition cycle is calculated based on the difference in revolution speed between the two points, and the value of variation in the revolution speed calculated successively is subject to statistically operational processing to thereby judge the condition of combustion in the internal combustion engine.

The aforementioned conventional technique has no consideration for judgment of of the degree of the combustion condition. There arises a problem in that no judgment can be made except the judgment as to whether the condition of combustion is normal or not.

Further, the aforementioned conventional technique has no consideration for disadvantages caused by the statistically operational processing. There arises a problem in that accuracy in detection is poor and in that the processing speed is too low to detect the condition of combustion in a timely manner.

SUMMARY OF THE INVENTION

An object of the present invention is to provide a method and apparatus which can grasp the condition of combustion finely.

Another object of the present invention is to provide a method and apparatus which can control an internal combustion engine finely by use of the aforementioned method and apparatus.

A further object of the present invention is to provide the combustion condition detecting method and apparatus of such a type as described above which are excellent both in detecting accuracy and in processing speed.

A still further object of the present invention is to provide a method and apparatus in which an internal combustion engine can be controlled with high accuracy in accordance with the condition of combustion by us of the aforementioned combustion condition detecting method and apparatus.

Another object of the present invention is to provide a crank angle sensor for use in performing the aforementioned control.

To attain the foregoing objects, according to the present invention, an output signal corresponding to the magnitude of the quantity of variation in rotation is generated.

Further, both the timing of ignition and the condition of fuel injection in the internal combustion engine are controlled in accordance with the degree of the quantity of variation in rotation.

Further, to attain the aforementioned objects, rotational angular acceleration within one combustion period is detected to judge that a predetermined cylinder is in an irregular combustion condition when the quantity of variation in rotational angular acceleration between adjacent cylinders is over a predetermined value.

Further, in response to a sudden variation in rotational angular acceleration in any cylinder, both the timing of ignition and the condition of fuel supply in the cylinder can be controlled.

Further, to attain the aforementioned objects, a crank angle sensor is provided to generate section pulses at intervals of an angle obtained by dividing an angle of 720 degrees by the number of cylinders to thereby detect rotational angular speeds equal to two crank angular widths.

According to the present invention having such a configuration as described above, an output signal is generated in accordance with the degree of irregular combustion. Accordingly, the degree of irregular combustion can be detected, so that the condition of combustion can be judged finely.

Further, both the timing of ignition and the condition of fuel supply in each cylinder can be controlled based on the above-mentioned output signal, so that the engine can be controlled finely. Accordingly, an optimum operation of the engine can be made.

With another configuration according to the present invention, the condition of combustion within one combustion period can be judged easily by comparison with the preceding condition of combustion, so that there is no delay in detection. Further, the condition of combustion can be detected with high accuracy because it is detected on the basis of the quantity of variation in rotational angular acceleration.

Further, the operating condition of the engine can be controlled accurately with no delay because both the timing of ignition and the condition of fuel supply in the engine can be controlled based on the abovementioned output signal.

In addition, the crank angle sensor can generate pulses at intervals of two equal angles within one combustion period, so that rotational angular speeds at two points can be obtained by counting up the pulses through a counter. Consequently, rotational angular acceleration can be obtained by calculating the difference between the rotational angular speeds or by dividing the difference by the period of one combustion cycle.

DESCRIPTION OF THE PREFERRED EMBODIMENTS

Figure 3:
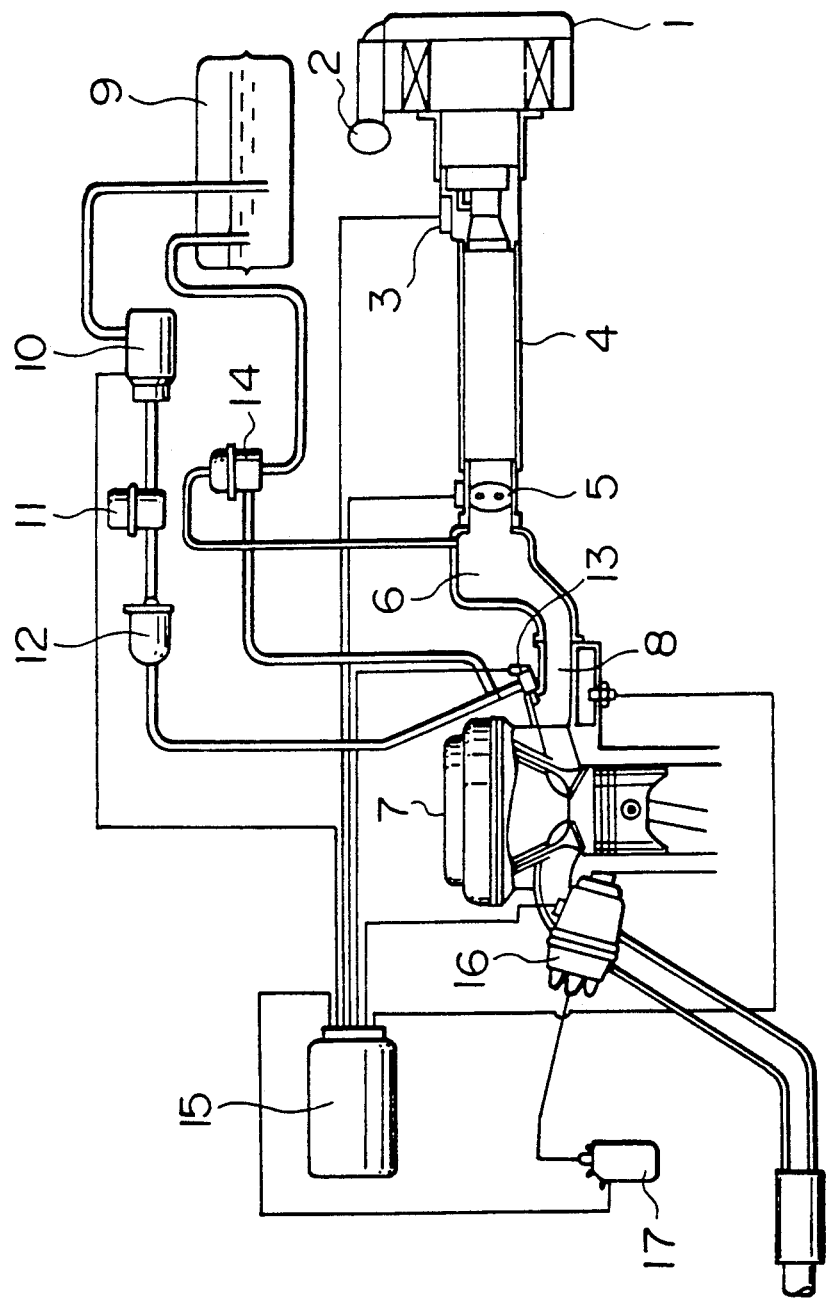
FIG. 3 is a schematic view showing a fuel injection system in an internal combustion engine in which the present invention is applied.

A fuel injection system in an internal combustion engine in which the present invention is applied will be described with reference to FIG. 3. Air is admitted into an inlet 2 of an air cleaner 1, passed successively through a hot-wire air flowmeter 3 for detecting the quantity of air intake, a duct 4 and a throttle body 5 having a throttle valve for controlling the air flow rate, and led into a collector 6. Then, the air is distributed into each suction pipe 8 directly communicating with an internal combustion engine 7 and sucked into a corresponding cylinder.

On the other hand, fuel is sucked and pressurized by a fuel pump 10 so that the fuel is supplied from a fuel tank 9 into a fuel system to which a fuel damper 11, a fuel filter 12, an injection valve 13 and a fuel pressure regulator 14 are connected through piping. The fuel is regulated by the regulator 14 and injected into the suction pipe 8 through the injection valve 13 provided in the suction pipe 8. An intake air quantity detection signal is generated from the air flowmeter 3 and fed into a control unit 15. A crank angle sensor is incorporated in a distributor 16 so as to generate a reference signal for indicating the timing of injection, a reference signal for indicating the timing of ignition, and a signal for detecting the revolution speed, those signals being fed into the control unit 15. The control unit 15 is constituted by an operation processor including an MPU, an ROM, an A/D converter and an input/output circuit. The control unit 15 performs predetermined operation processing based on the output signal of the air flowmeter 3, the output signal of the distributor 16 and the like so as to make the injection valve 13 operate on the basis of the output signal of the control unit 15 which is a result of the operation processing so that the injection valve 13 injects a necessary quantity of fuel into each suction pipe 8. Further, the timing of ignition is controlled by a control signal fed from the control unit 15 to a power transistor of an ignition coil 17.

Figure 1:
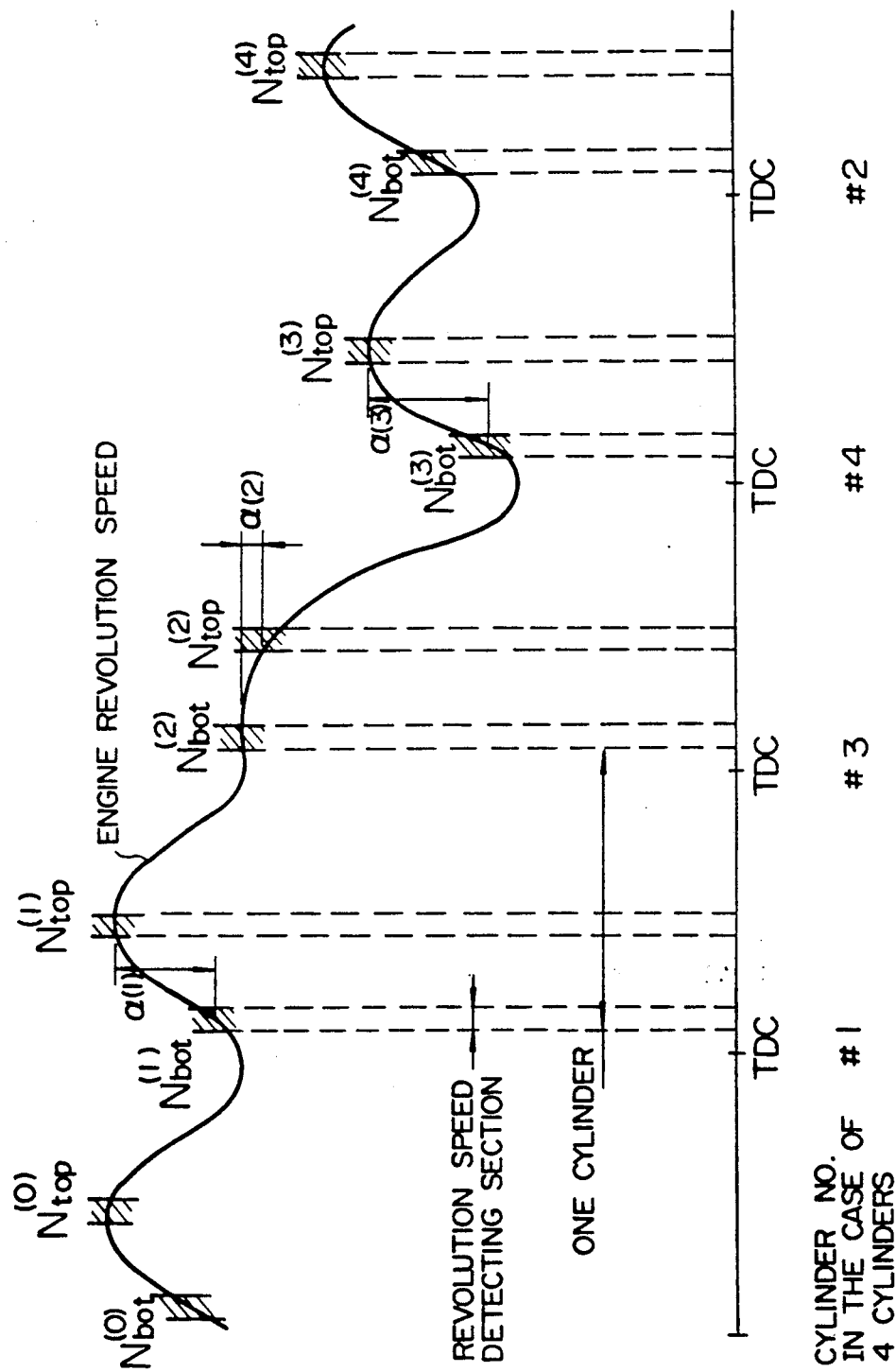
FIG. 1 is a waveform diagram for explaining the variation in engine revolution speed and the revolution speed detecting sections for each cylinder according to the present invention.

An embodiment of the present invention will be described below with reference to FIG. 1. The revolution speed of the engine varies for example in such a manner as shown in the drawing. This is because acceleration is given by an explosion stroke and deceleration is given by the other stokes. In the past, a value of instantaneous speed obtained by measuring a section time at $N_{top}$ in the vicinity of a point where the revolution speed takes its maximum is compared with a preceding value of the same to calculate the difference $\Delta N$ therebetween. However, a condition change caused by irregular combustion appears directly as a variation in rotational torque. Accordingly, the condition change can be judged correctly on the basis of the change of acceleration rather than on the basis of the speed change $\Delta N$.

Acceleration is obtained as follows. Instantaneous speeds are measured at two points before and after a point where rotational acceleration in the engine takes its maximum within an explosion stroke. Let the values thus obtained be $N_{bot}$ and $N_{top}$. Let the difference between $N_{top}$ and $N_{bot}$ be $\alpha$. The value $\alpha$ is regarded as acceleration. Further, the difference between the value $\alpha$ and the value $\alpha$ in the preceding cylinder is calculated as $\Delta\alpha$.

Figure 2:
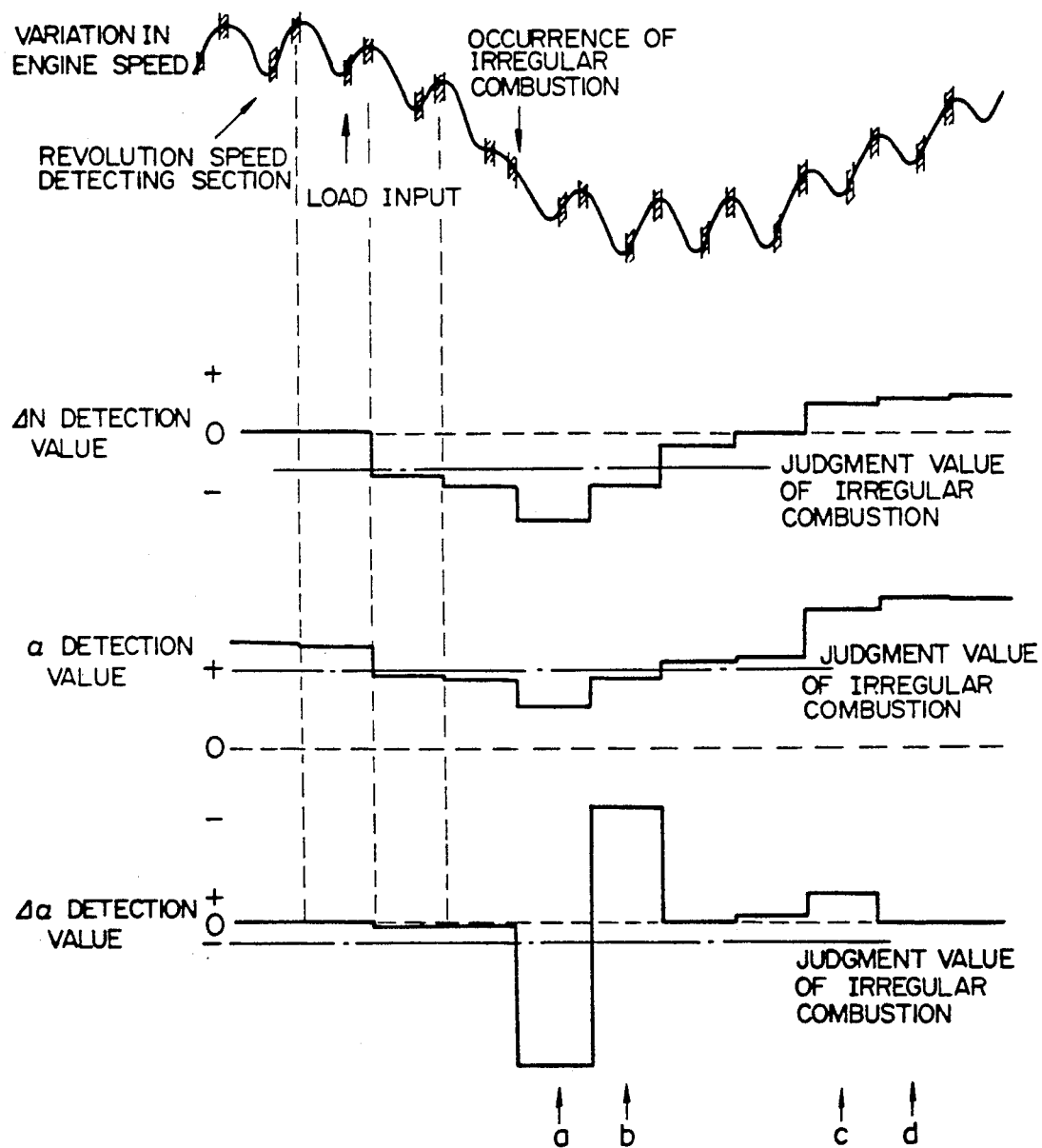
FIG. 2 is a characteristic diagram for explaining an embodiment of the present invention.

Extremely irregular combustion can be discriminated securely by the judgment based on $\Delta N$. If the system is made so that even slightly irregular combustion is similarly can be judged, however, a problem arises in that lowering of the total level caused by an external load is regarded as irregular combustion (FIG. 2). To make the judgment based on $\Delta N$ exactly, an average value of the revolution speed must be always calculated to change a judgment value corresponding to the calculated value.

Also in the judgment based on $\alpha$, the judgment value must be changed because the total level is lowered when an external load is given.

In the judgment based on $\Delta\alpha$, irregular combustion can be judged with no influence of the outside as shown in FIG. 2. This is because acceleration in the explosion stoke depends on the condition of combustion though the revolution speed is lowered by the external load. An effect of averaging can be attained by calculating $\Delta\alpha$ as a difference from in the preceding cylinder, though the total level is lowered in the judgment based on $\alpha$. In short, only the condition of irregular combustion can be securely discriminated by the judgmentment based on $\Delta\alpha$.

According to a method of calculating $\Delta\alpha$ (Refer to FIG. 1), the detection value jumps up to the plus side just after the lowering of the detection value caused by irregular combustion. A more accurate judgment can be made by using this phenomenon.

Figure 4:
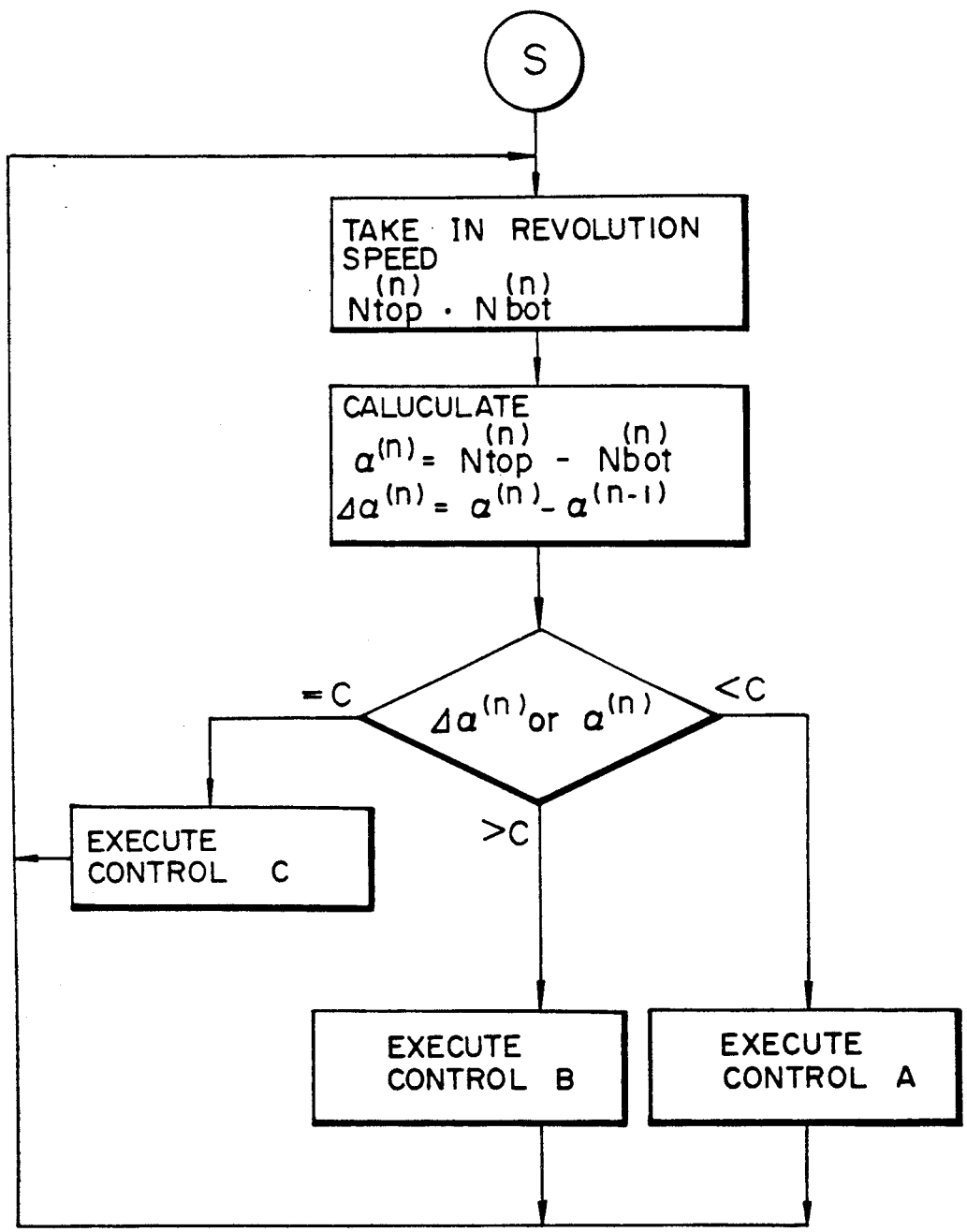
FIG. 4 is a flow chart of control processing according to the present invention.

A flow chart is shown in FIG. 4. Values of the revolution speed $N_{bot}$ and $N_{top}$ are measured before and after an explosion stroke where acceleration takes its maximum, based on signals given from the crank angle sensor (included in the distributor 16 in FIG. 3). The following values are calculated.

$$a(n) = N_{top}^{(n)} - N_{bot}^{(n)}, \text{ and}$$
$$\Delta a(n) = a(n) - a(n-1)$$
$$= \{N_{top}^{(n)} - N_{bot}^{(n)}\} - \{N_{top}^{(n-1)} - N_{top}^{(n-1)}\}$$

The value of $\Delta a$ is compared with a comparative value C to thereby judge what kind of control should be made. (C may represent a plurality of different comparative values.) This judgment is made by the control unit 15 (FIG. 3). Alternatively, a signal may be directly fed to an actuator so that the judgment is made by the actuator. Ignition timing control is now considered as an example of control process A-C. When this method is used for such ignition timing control, the timing of ignition is hastened in the control A because combustion is regarded as irregular. In the control B, the timing of ignition is delayed. In the control C, nothing is made.

As described above, irregular combustion can be detected by this detecting method. Further, not only it can be detected but the cylinder in which irregular combustion has occurred can be judged. FIG. 2 shows an example of a 4-cylindered engine in which a symbol "#" represents the cylinder number. In this case, the fact that irregular combustion has occurred in the cylinder #2 is judged from the TDC signal of the crank angle sensor. In short, the slit size of the TDC signal of the crank angle sensor is changed to specify the cylinder number.

Figure 5:
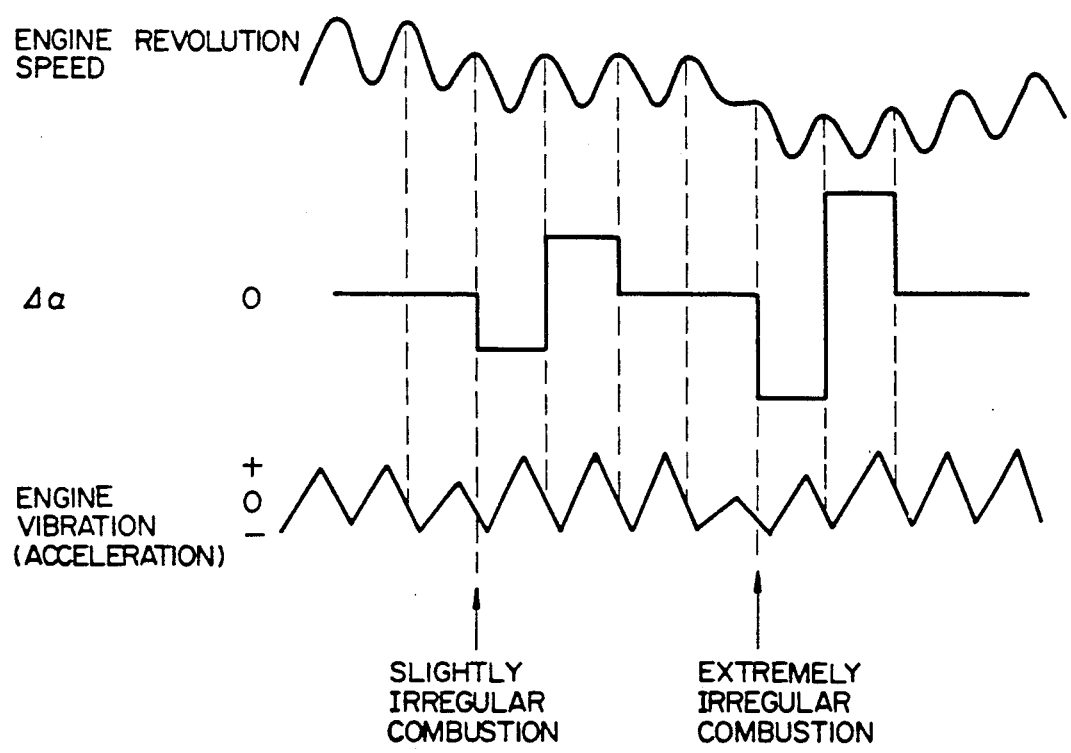
FIG. 5 is a diagram for explaining a method of directly observing engine acceleration according to the present invention.

A method of directly observing engine acceleration is shown in FIG. 5.

An acceleration pickup is attached to the engine so that roll-direction acceleration can be measured. FIG. 5 shows the result of observation of the value of acceleration. In the case of normal combustion, the top is high and sharp. In the case of irregular combustion, the top is low and round. By use of this phenomena, irregular combustion can be judged by measuring the sharpness of the top. According to this method, a variation of engine torque can be directly observed as a variation of acceleration with no calculation of $\Delta a$ or the like. In short, this method is most accurate.

The condition of combustion can be judged almost perfectly by using the $\Delta N$ method, the $\Delta a$ method and the acceleration metering method in combination.

As described above, a signal from the crank angle sensor is used in the $\Delta a$ method. In most cases, however, the crank angle sensor is mounted on a cam shaft, so that an exact crank angle cannot be known because of an error caused by backlash of a gear or the like. Therefore, an electromagnetic pickup is attached to a ring gear of a flywheel being in contact with a crankshaft. An exact crank angle can be found by generating a signal through the pickup. Accordingly, a signal low in error can be obtained so that the value of acceleration and the value of difference of acceleration $a$ can be obtained more exactly.

Figure 6:
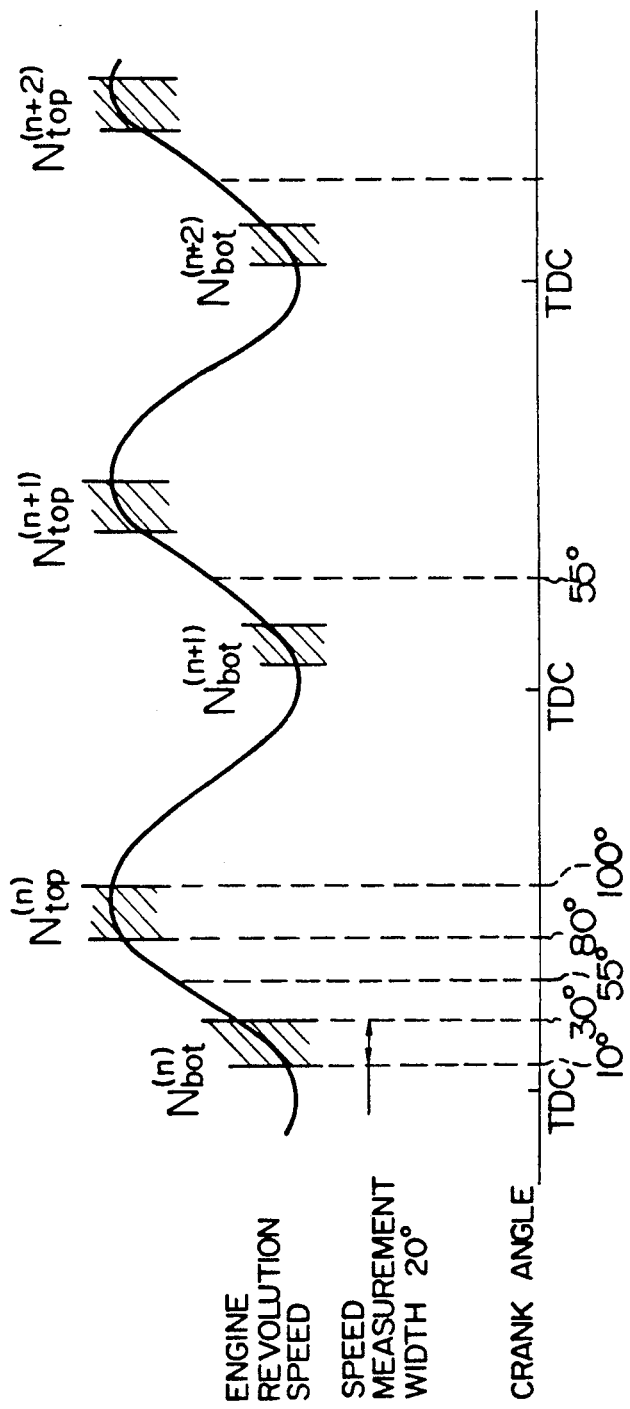
FIGS. 6 and 7 are waveform diagrams for explaining the operation for measuring acceleration as an embodiment of the present invention.
Figure 7:
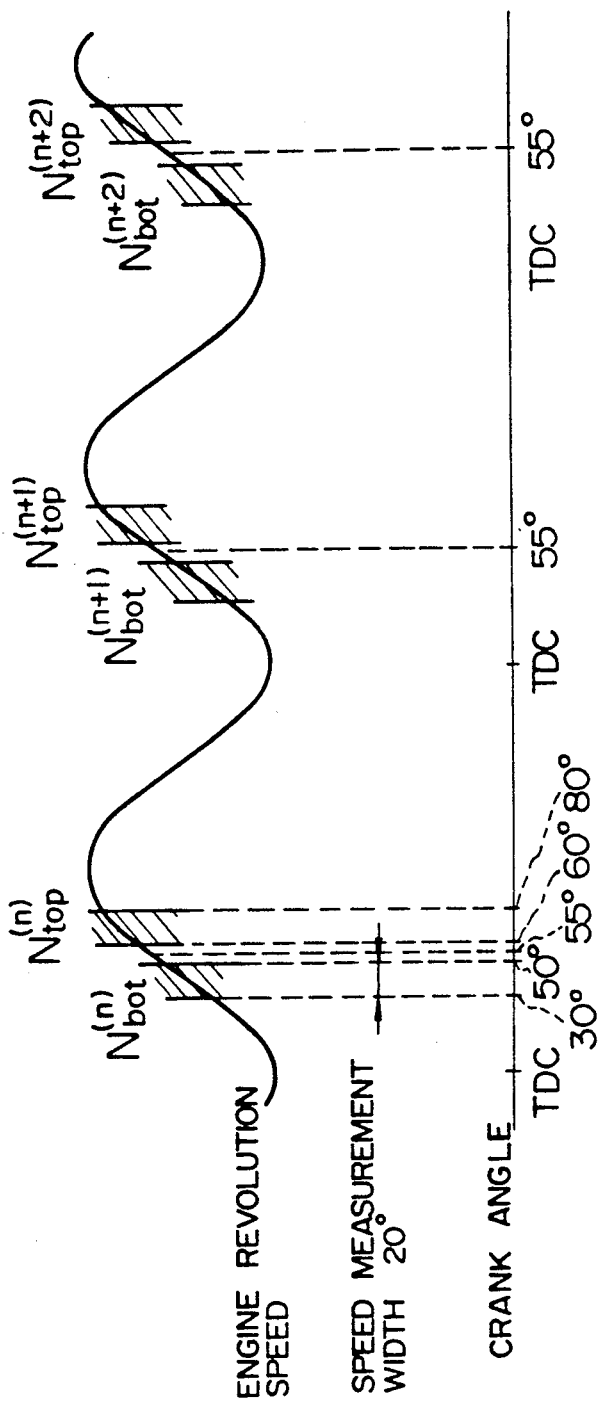

Examples of points for measurement of $N_{bot}$ and $N_{top}$ are shown in FIGS. 6 and 7. According to experiments, it is found that there is no misjudgment when the condition of combustion is judged after measuring two values of revolution speed $N_{bot}$ and $N_{top}$ at each width of 20° with the angle of 55° as a center after TDC, and calculating the acceleration $a$ and the acceleration difference $\Delta a$ from the values. Although FIGS. 6 and 7 show the case where the speed measurement width is set to 20°, this width has been not discussed yet.

Figure 8:
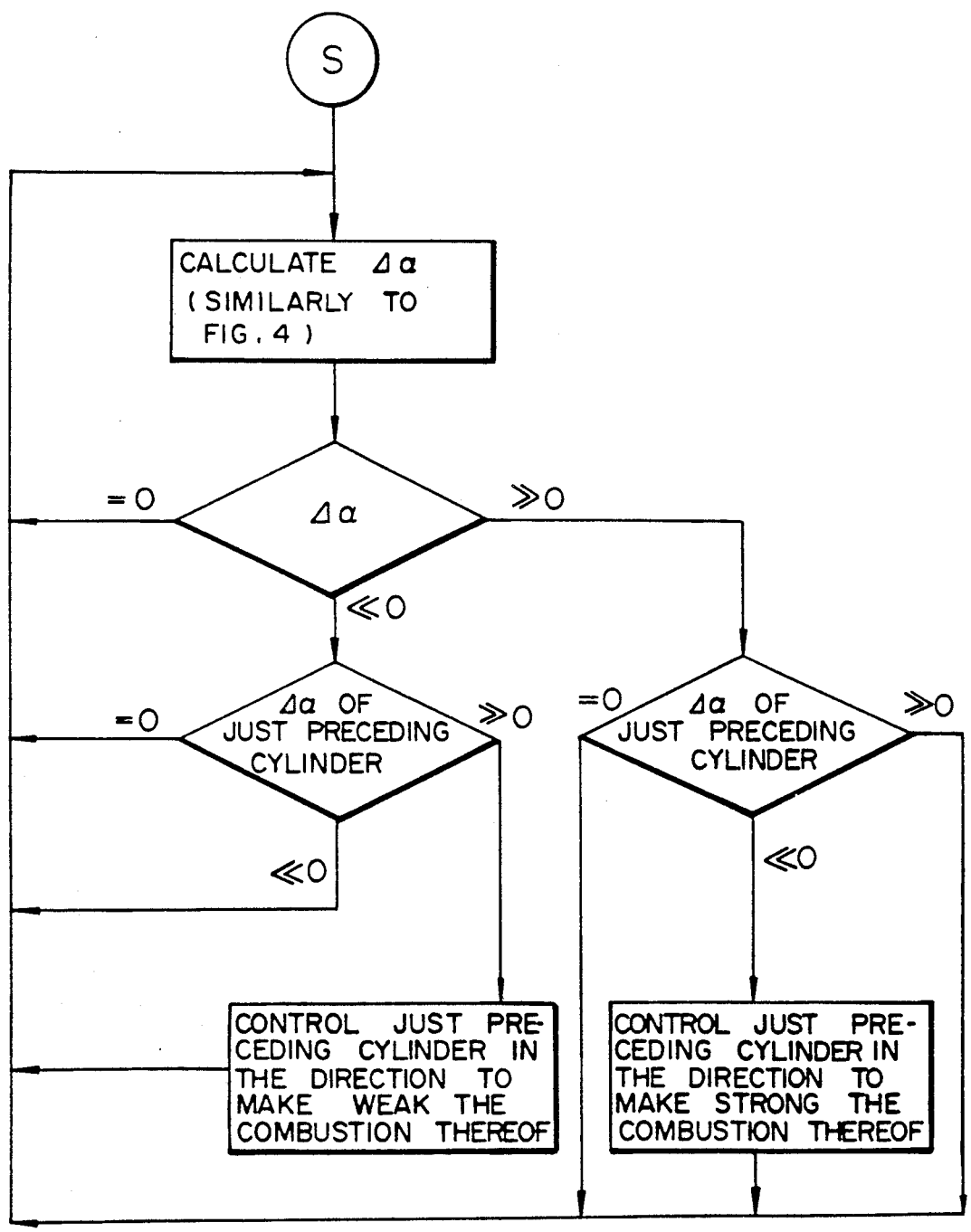
FIG. 8 is a flow chart for explaining the operation of ignition timing control according to the present invention.

An example in which the present invention is used for ignition timing control in an internal combustion engine is described with reference to FIGS. 2 and 8.

In this invention, the condition of combustion in each cylinder of the internal combustion engine is always detected. A judgment for each cylinder is made based on acceleration $a$ in an explosion stroke. Accordingly, the acceleration difference $\Delta a$ can be used as a standard for judgment of the condition of combustion.

In the $\Delta a$ detection value at the points a and b in FIG. 2, the value of $\Delta a$ moves greatly to the minus side when irregular combustion occurs. Just after this, the value moves greatly to the plus side. At the points c and d, the engine speed is to return. Accordingly, the value of $\Delta a$ exhibits 0 at the point though it moves to the plus side at the point c.

As described above, when irregular combustion occurs in a certain cylinder, the $\Delta a$ detection value in the next cylinder always moves greatly.

This can be explained as follows, with reference to a flow chart of FIG. 8. With respect to the value of rotational $\Delta a$, reference is to be made to FIG. 2.

First, the value of $\Delta a$ in the #2 cylinder is detected. Because this has a negative value, the value of $\Delta a$ in the preceding cylinder is examined. Because the condition of the #4 cylinder is normal, the value of $\Delta a$ is zero. With no control, the value of $\Delta a$ in the next, #1 cylinder is detected. This is a positive value. Therefore, controlling is made to weaken the combustion in the just before, #2 cylinder according to the flow chart.

A variety of control processes as shown in Table 1 is considered as this control.

TABLE 1

| $\Delta a$ in just preceding cylinder | $\Delta a$ in cylinder under detection | Ignition timing | Quantity of fuel injection |
|---|---|---|---|
| + | + | Not change. | Not change. |
| − | + | Advance angle. | Increase. |
| + | − | Lag angle. | Decrease. |
| − | − | Not change. | Not change. |

In this embodiment, the condition of combustion is classified by the width of variation in revolution speed as shown in Table 2.

TABLE 2

| Width of variation in revolution speed | −10 rpm | Variation in ordinary operating condition (Normal combustion). |
|---|---|---|
| | 10–20 rpm | Variation in revolution speed due to slightly irregular combustion. |
| | 20–40 rpm | Variation in revolution speed due to middle irregular combustion. |
| | 40– rpm | Variation in revolution speed due to middle irregular combustion. |

The value of advance angle, the value of lag angle and the increasing/decreasing rate of fuel are changed in accordance with the degree of variation of the revolution speed.

Figure 9:
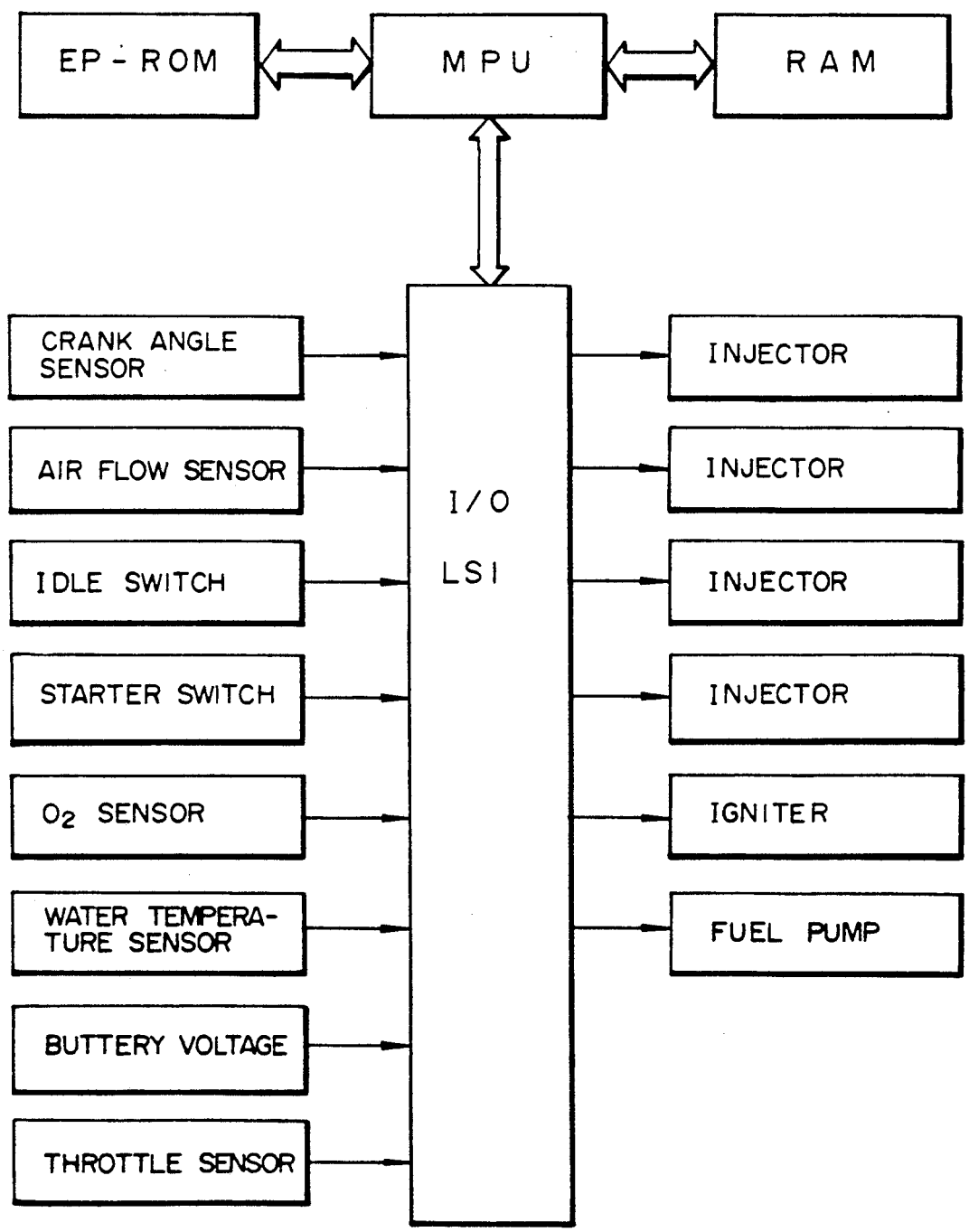
FIG. 9 is a block diagram generally showing the configuration of an embodiment of the internal combustion engine control apparatus according to the present invention.

FIG. 9 shows the configuration of an embodiment of the internal combustion engine control apparatus according to the present invention.

The configuration of the conventional engine control apparatus is sufficient as that of this engine control apparatus according to the present invention with no additional constituent components. In short, cost saving can be attained.

Figure 10:
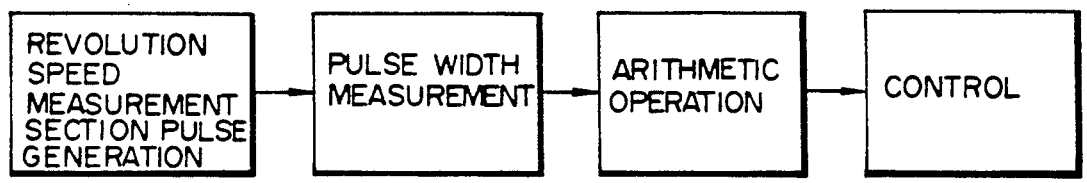
FIG. 10 is a block diagram showing the functions of the embodiment.

FIG. 10 shows a block diagram showing the functions of the embodiment.

In this embodiment, changes in the condition of combustion is judged from changes in rotational angular acceleration in the engine crankshaft. It is therefore necessary to measure acceleration in an explosion stroke in which the change of the condition of combustion is best shown.

First, a pulse signal showing an explosion stroke is generated in the revolution speed measurement section pulse generating portion.

Figure 11:
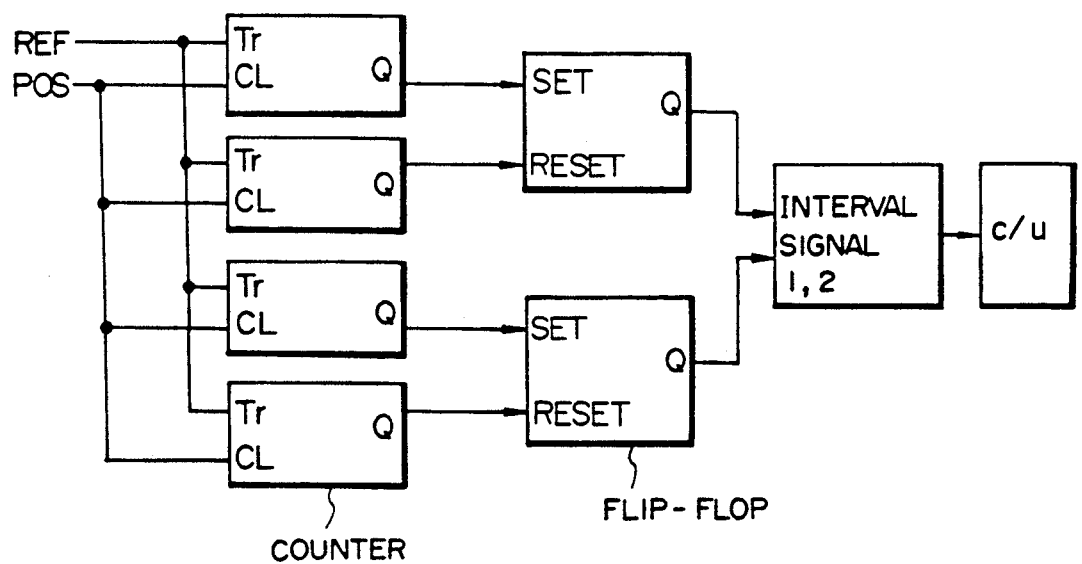
FIG. 11 is a block diagram showing an example of the revolution speed measuring section pulse generating portion.

Examples of a method used herein are a method of synthesizing a pulse signal from an $R_{ef}$ signal and a $P_{os}$ signal as shown in FIG. 11, a method of preparing slits in the crank angle sensor as will be described later, and the like.

Then, the section time of the pulse signal thus generated is measured by a pulse width measuring portion. A method using a counter included in the c/u, a method using an outside counter, and the like, are considered as a method used herein.

In the arithmetic operation portion, the measured time is converted into revolution speed to thereby calculate an acceleration and an acceleration difference.

Control is made based on the values thus obtained.

Figure 12:
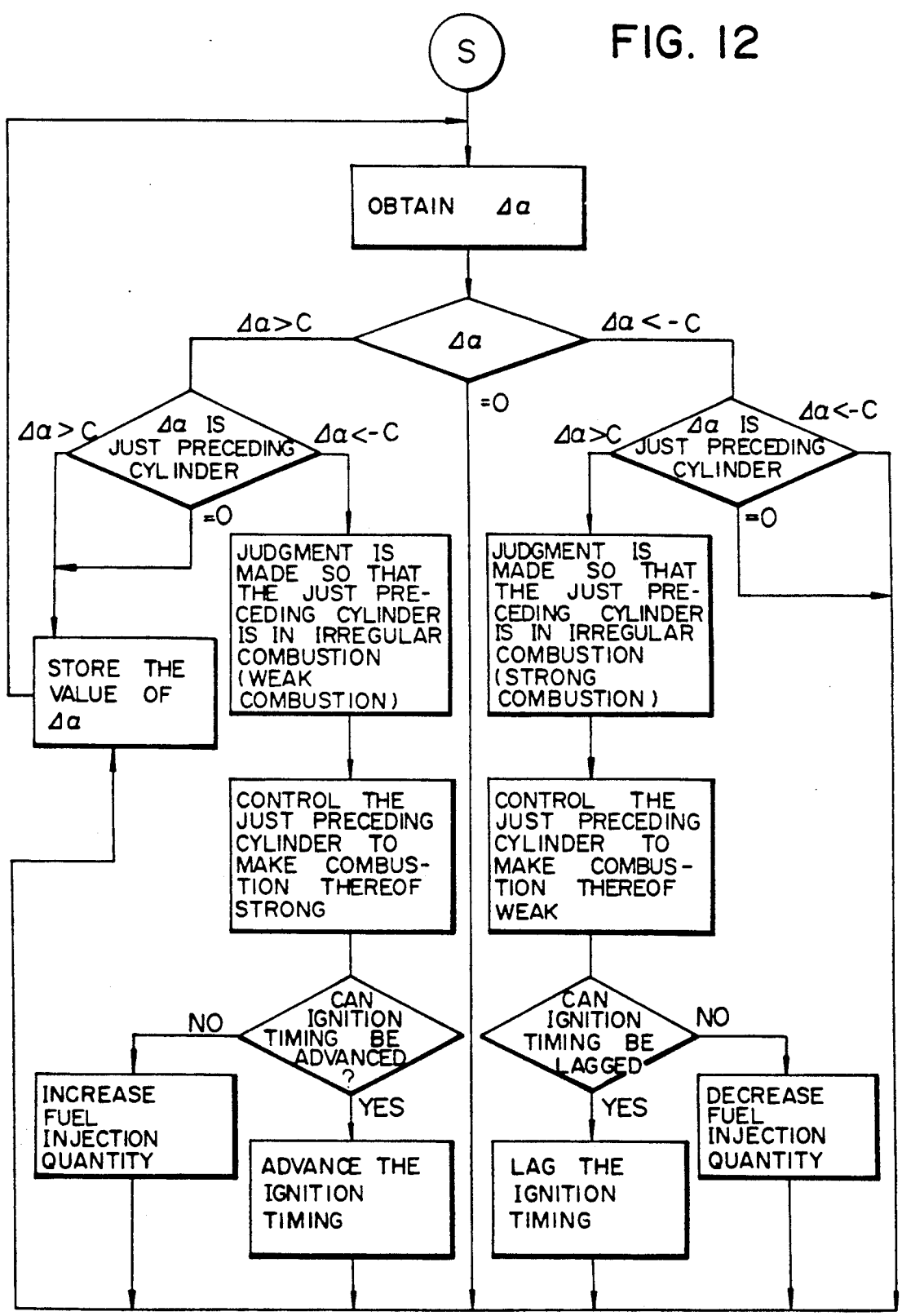
FIG. 12 is a flow chart of a process for detecting the condition of combustion and controlling the internal combustion engine based on the detection.

FIG. 12 is a flow chart showing an embodiment of the combustion condition detecting method according to the present invention.

Irregular combustion is judged by use of the values obtained in FIG. 4.

Assuming now that the value of $\Delta\alpha$ in a cylinder in irregular combustion is more than a judgment value and that combustion in a next cylinder is normal, then the sign of the value in the next cylinder is inverted to that in the abnormal cylinder. Therefore, when $\Delta\alpha$ is more than an abnormality judgment value, $\Delta\alpha$ in the just preceding cylinder is examined. If the value in the current cylinder is reverse in sign and more than the judgment value, it can be found that irregular combustion has occurred in the just preceding cylinder.

Therefore, the timing of ignition is changed to make the combustion in the just preceding cylinder normal. If control based on the timing of ignition is difficult, the quantity of fuel injection is changed.

A method of calculating acceleration $\alpha'$ is as follows. Values of the instantaneous speed are measured at two positions before and after a certain crank angle at which rotational acceleration is maximized within an explosion stroke of the engine. Let $N_{bot}^{(n)}$ be a value obtained at a point before the crank angle. Let $N_{top}^{(n)}$ be a value obtained at a point after the crank angle. Let the difference between $N_{top}^{(n)}$ and $N_{bot}^{(n)}$ be acceleration $\alpha(n)$. The value o obtained by this method represents pseudo-acceleration which is different from acceleration in its original sense as a value obtained by differentiating a velocity with respect to time. However, there is little time difference between the speed measurement sections in an engine condition (for example, idling) in which the engine revolution speed is stable. Accordingly, it can be considered with no problem that there is no influence on the value of acceleration. In short, it can be said that this method is effective when the engine revolution speed is constant.

However, when the engine revolution speed changes widely (for example, at the time of acceleration/deceleration in a car), the time difference between the speed measurement sections becomes large. Therefore, consideration of the term of time in the definition of acceleration is required.

Figure 13:
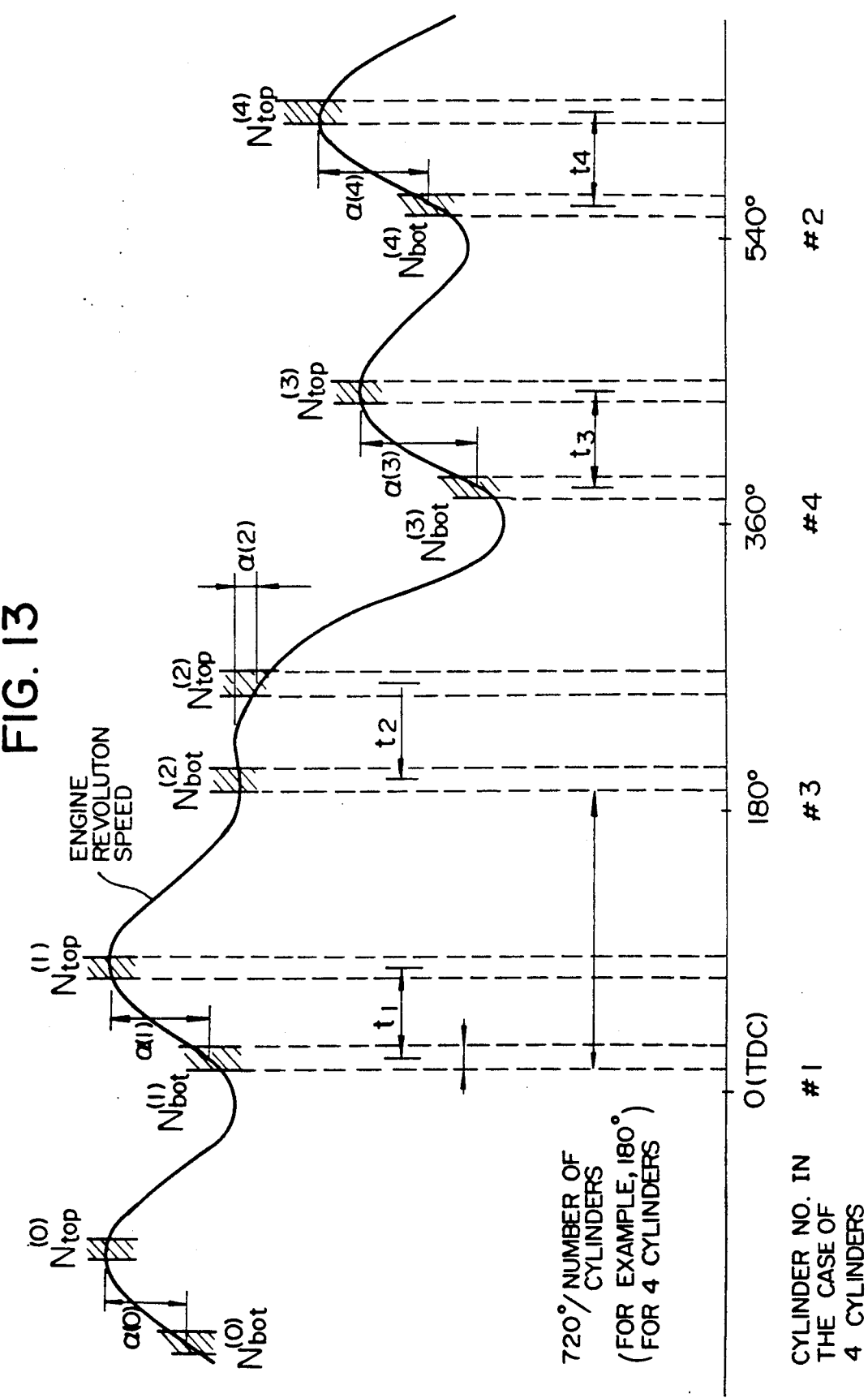
FIG. 13 is a diagram for explaining a method for calculating $\alpha$ and $\Delta\alpha$.

Therefore, acceleration is calculated by a method as shown in FIG. 13.

First, the difference $\alpha$ between and $N_{top}^{(n)}$ and $N_{bot}^{(n)}$ is calculated. At the same time, the time t(n) between the speed measurement sections is measured. Then, $\alpha(n)$ as acceleration in its original sense is calculated by dividing $\alpha$ by t(n). By use of the value $\alpha'(n)$, acceleration in an explosion stroke can be exactly obtained with no influence of the term of time caused by the change of the revolution speed.

Figure 14:
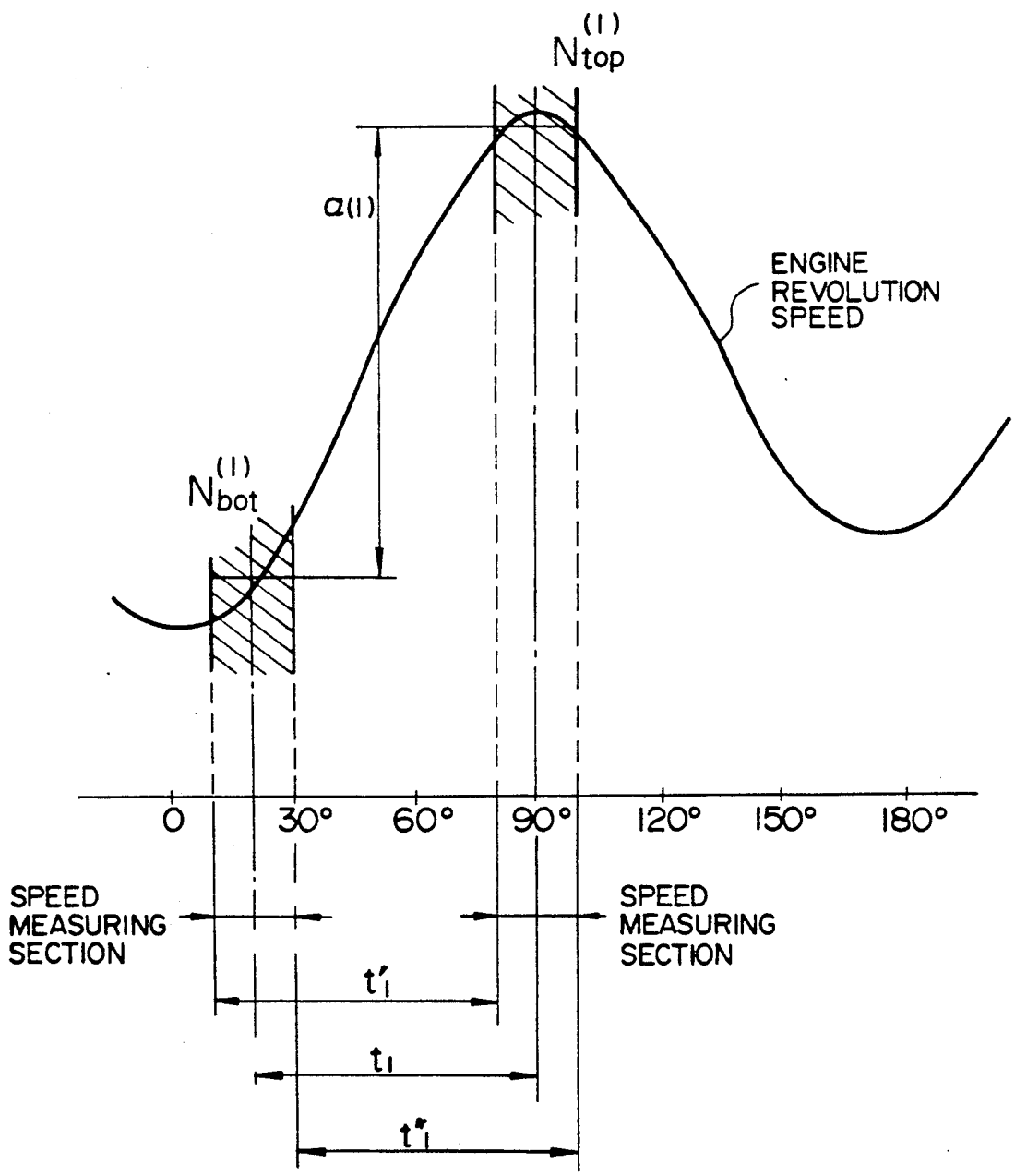
FIG. 14 is a diagram for explaining a method for calculating acceleration $\Delta\alpha$.

A method of measuring the time t between the speed measurement sections is shown in FIG. 14. The values $N_{bot}^{(n)}$ and $N_{top}^{(n)}$ of the revolution speed represent average speed values in speed measurement sections. When $\alpha'(n)$ is obtained from the two speed values, it is necessary to divide dN by dt. Although it is preferable that the time $t_1$ obtained by measuring the difference between the respective centers of the sections in which $N_{bot}^{(n)}$ and $N_{top}^{(n)}$ are respectively measured is used as dt, it is a matter of course that the value to be used as dt is not limited to the time $t_1$. In practice, $t_1'$ obtained by measuring the difference between the start point of one speed measurement section and the start point of the other speed measurement section or $t_1''$ obtained by measuring the difference between the end point of one speed measurement section and the end point of the other speed measurement section may be used as dt. There is no trouble in the case of using the value such as $t_1'$ and $t_1''$, because the speed measurement sections are extremely small.

In the following, the crank angle sensor as an embodiment of the present invention is described with reference to FIGS. 14 through 19.

The outline of the present invention is now described with reference to FIG. 15. In an internal combustion engine, particularly, in a 4-cycle engine, strokes of air intake, compression, combustion and exhaust are repeated in each cylinder. As the whole of the engine, combustion occurs at intervals of an angle (180° in the case of 4-cylindered engine) obtained by dividing the crank angle 720° by the number of cylinders. However, the rotational angular speed produced in the crankshaft changes as shown in the drawing because of the change of pressure. Further, rotational angular acceleration changes as shown in the lower side of the drawing. The peak of rotational angular acceleration is in a position where the rotational angular speed takes a middle value between a minimum and a maximum. A method of detecting rotational angular acceleration has been discussed based on the fact that the condition of combustion in each cylinder can be detected by detecting rotational angular acceleration in each cylinder. As a result of the discussion, it has been found that the rotational angular speed can be well detected and that the condition of combustion in each cylinder can be grasped by a method of the steps of: calculating values of angular speed at two points opposite to each other with respect to the peak of rotational angular acceleration; and calculating the difference between the two values of angular speed and, if necessary, dividing the value of angular speed difference by the time between the two points.

Figure 15:
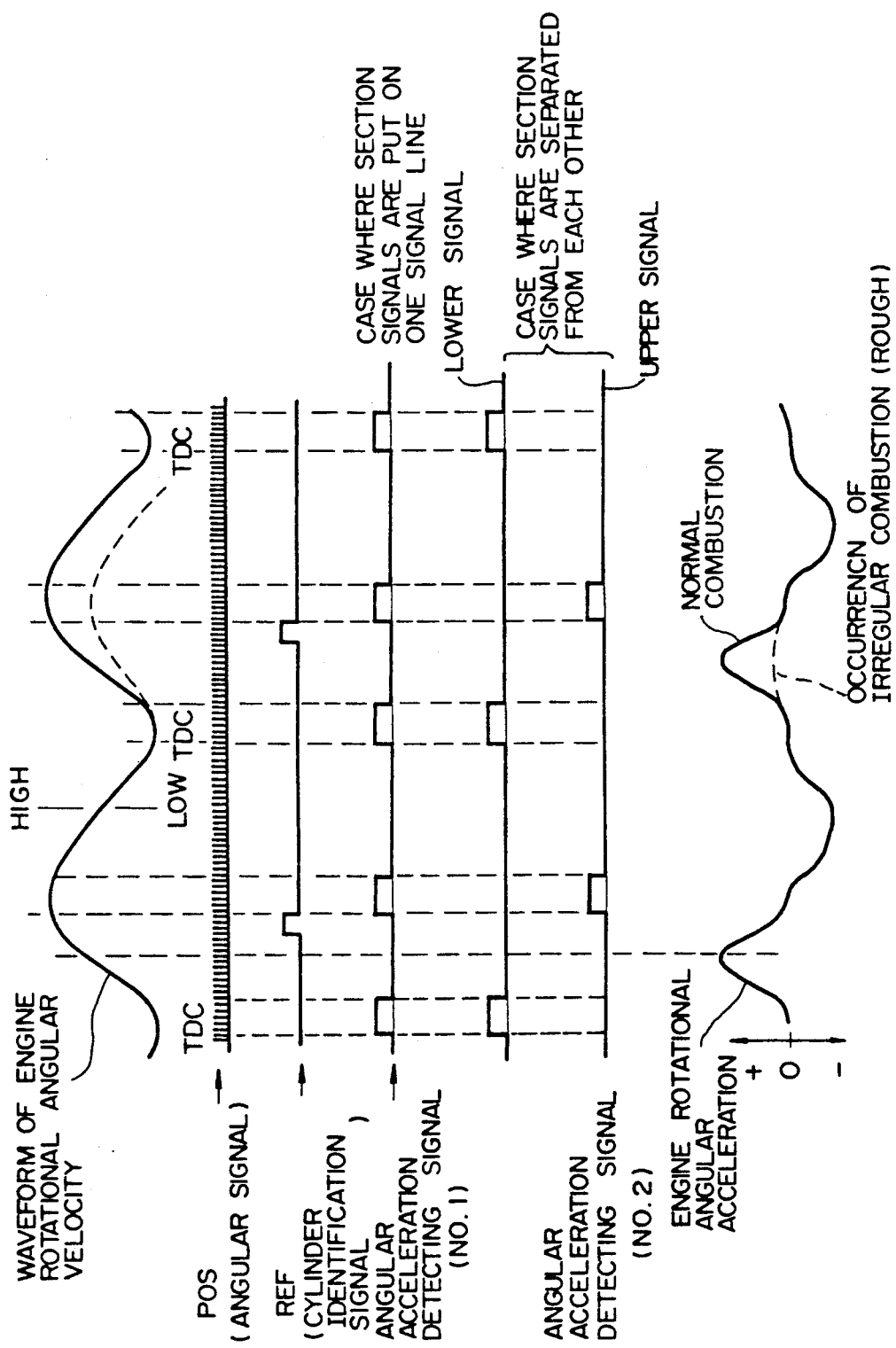
FIG. 15 is a diagram for explaining a condition of the crank angle sensor according to the present invention.

In this embodiment, a crank angle sensor for generating section pulses as shown in FIG. 15 as a third output signal independent of the conventional one-degree reading angle signal $P_{os}$ and the cylinder identification signal $R_{ef}$ generated for each cylinder is provided for the purpose of generating a crank angle signal for detecting values of the angular speed at two points to thereby grasp the condition of combustion in each cylinder. In FIG. 15, the angular speed detection point is represented by a section signal. The angular speed can be obtained by measuring the pulse width of the section signal. However, the following two cases are considered from the limitation of the apparatus-side processing circuits. In one case, the section signal pulses are separated into two signals, namely, an upper signal ($U_{per}$ corresponding to the section having a high angular speed, and a lower signal ($L_{ower}$ corresponding to the Section having a low angular speed, and then the two signals are put on independent signal lines, respectively. In the other case, the two kinds of section signal pulses are put on one signal line. The section pulses of both the lower and upper signals, $U_{per}$ and $L_{ower}$ must have the same crank angle width. Various errors show a tendency to decrease as the pulse width increases. Accordingly, in the case where the sensor is provided in the place where large errors may arise, it is necessary to increase the pulse width to a crank angle of about 20 degrees.

Figure 16A:
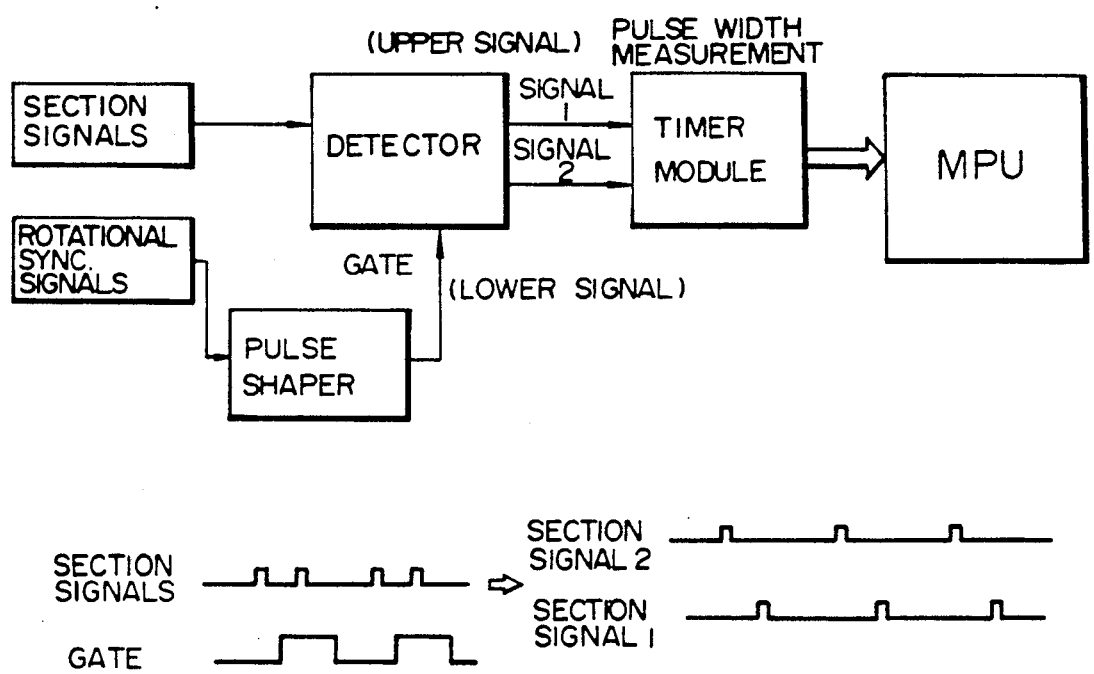
FIGS. 16A and 16B are diagrams for explaining output processing of the crank angle sensor according to the present invention.
Figure 16B:
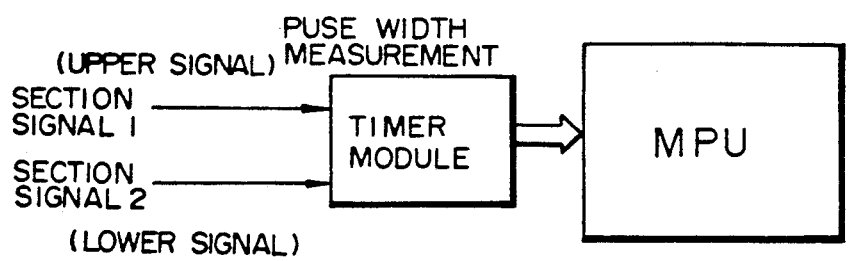

FIGS. 16A and 16B show examples of the apparatus by which the section signal generated from the sensor is processed.

In the case where the section signals are put on one signal line, as shown in FIG. 16A, two processing methods can be used. One is a method in which a measured value is stored in a memory whenever a section pulse is supplied to a pulse width measurement timer module. The other is a method in which two section pulses are separated through a detection circuit and then put on the pulse width measurement timer module through independent ports.

The section signal separation type processing circuit as shown in FIG. 16B is simple in configuration because two section pulses are directly put on the pulse width measurement timer module through independent ports.

Because the peak position of angular acceleration is put on an ATDC range from 50 degrees to 60 degrees, the output positions of the section pulses are determined so that the peak position of angular acceleration is put between the lower section pulse $L_{ower}$ and the upper section pulse $U_{per}$. In short, the lower section pulse $L_{ower}$ is put on an ATDC range from 30 degrees to 50 degrees and, on the other hand, the upper section pulse $U_{per}$ is put on an ATDC range of from 60 degrees to 80 degrees. In general, sensitivity is improved as the $L_{ower}$ side and the $U_{per}$ side approach each other. The upper limit of separation between the $L_{ower}$ side and the $U_{per}$ side is in the case where the $L_{ower}$ Side and the $U_{per}$ side are respectively in an ATDC range from 10 degrees to 30 degrees and in an ATDC range from 80 degrees to 100 degrees. These are a position of the $L_{ower}$ side where the angular speed is minimized and a position of the $U_{per}$ side where the angular speed is maximized.

In the following, a crank angle signal generating mechanism is described in detail with reference to FIGS. 17A, 17B, 18A, 18B, 19A and 19B.

Figure 17A:
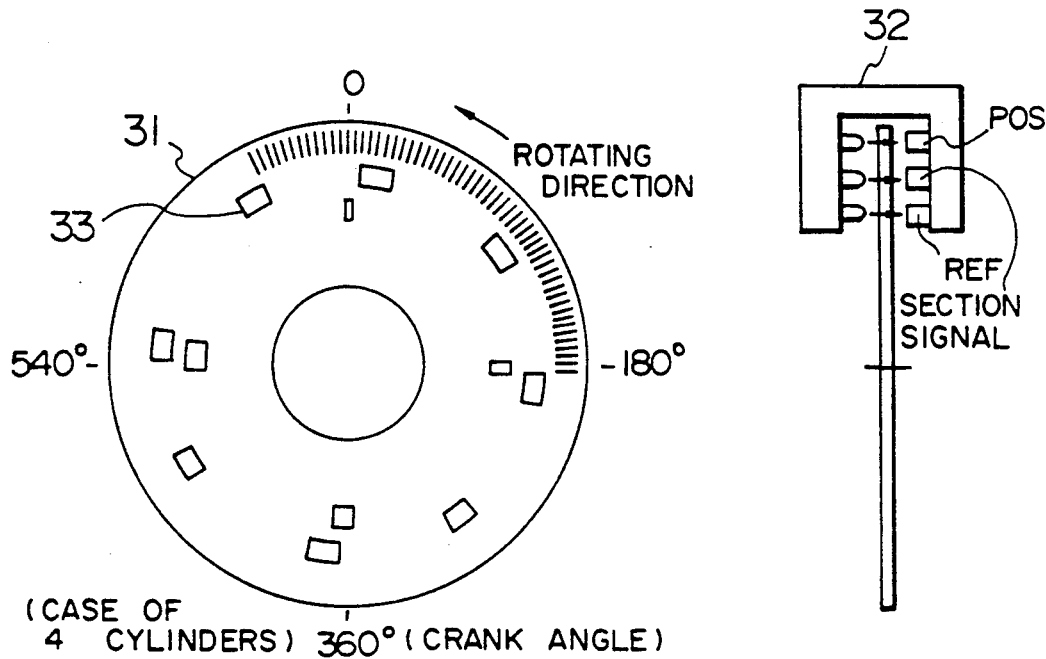
FIGS. 17A and 17B are views showing embodiments of the crank angle sensor according to the present invention, in which a combination of a slit plate and photo-interrupters are used.
Figure 17B:
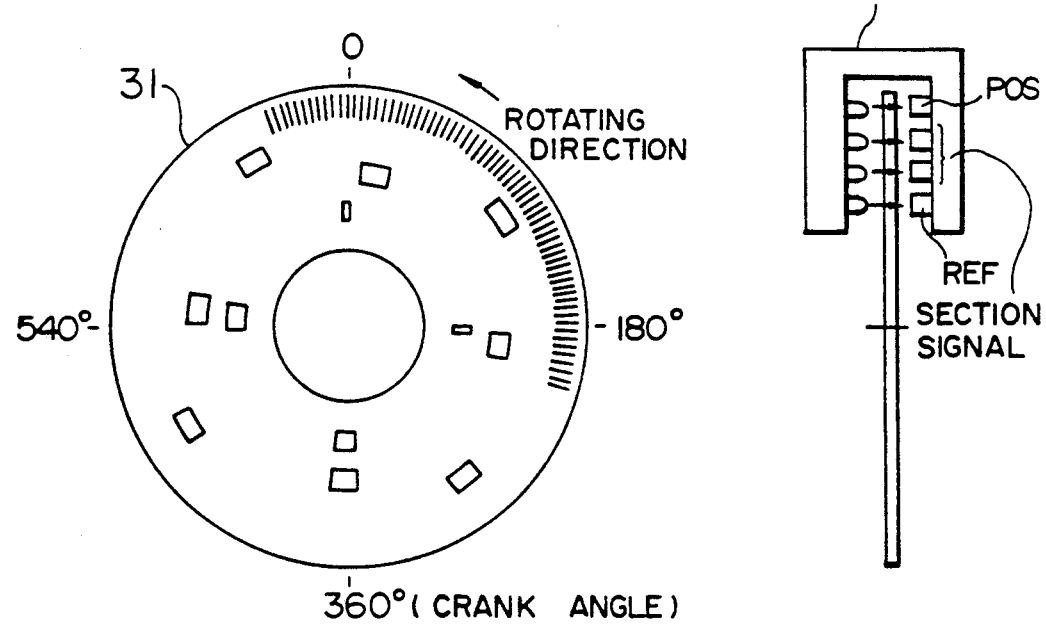

Referring now to FIGS. 17A and 17B, slits 33 corresponding to section pulses are provided in a disk 31 which makes one turn at an angle of 720 degrees in synchronism with the crankshaft. Section pulse signals are generated when the sections of the slits are detected by means of a photo-interrupter 32. The operation of the photo-interrupter is as follows. When a detection portion of the photo-interrupter 32 is intercepted by the disk, the output of the photointerrupter 32 is turned off. When the detection portion is in a slit portion of the disk, the output of the photo-interrupter 32 is turned on. In this case, in order to put the section signals on one signal line as shown in FIG. 17A, the positions of slits for generating two section pulses must be provided concentrically on one disk, independent of angle measurement slits arranged at equal angular sections and cylinder identification slits arranged at sections of an angle obtained by dividing the crank angle of 720 degrees by the number of cylinders.

In the case where the section signals are separated from each other as shown in FIG. 17B, the pulse generation slits are provided doubly concentrically on one disk, so that it is necessary to provide 4 pairs of photo-interrupters in the section generation side.

In this case, accuracy in processing the slits and backlash produced by rotation of the disk connected to the crankshaft through a gear or a chain are considered as two main causes of errors in section measurement. Accordingly, in order to reduce error, the section pulse width must be enlarged to about 20 degrees.

Figure 18A:
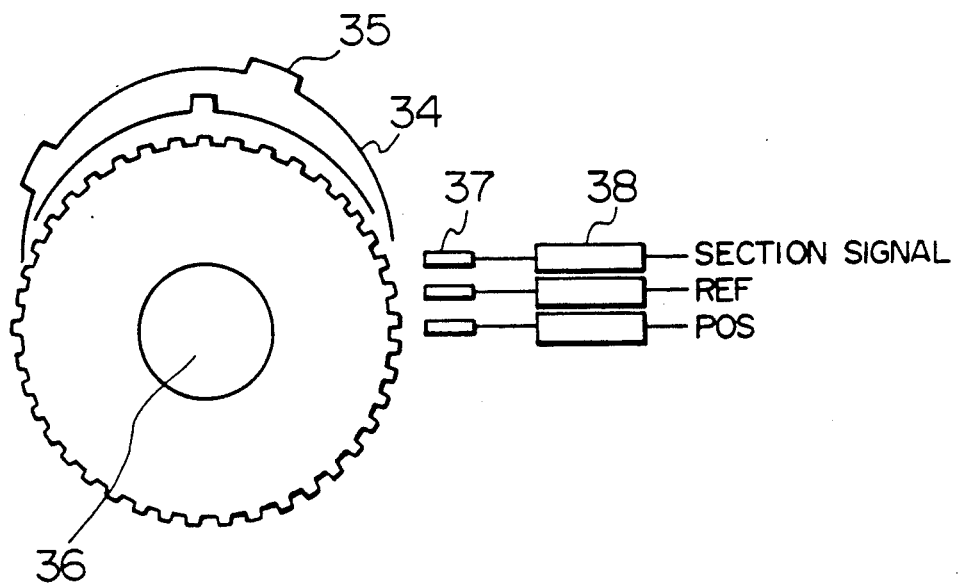
FIGS. 18A and 18B are views showing other embodiments of the crank angle sensor according to the present invention, in which a combination of a ring gear and electromagnetic pickups are used.

In the following, another example of the crank angle signal generating mechanism is described with reference to FIGS. 18A and 18B. Projections 35 corresponding to the section pulses are provided in a magnetic ring gear 34 which rotates in synchronism with the crankshaft. The sections of the projections are detected by electromagnetic pickups 37 fixed to the engine side, so that a pulse signal is generated from the respective electromagnetic pickup 37. The operation of the respective electromagnetic pickup is as follows. When one of the magnetic projections approaches a detection portion of the electromagnetic pickup, the output of the pickup is turned on. When one of the magnetic projections is separated from the detection portion of the electromagnetic pickup, the output of the pickup is turned off. In this case, in order to put the section signals on one signal line as shown in FIG. 18A, the mount position of a magnetic toothed wheel 5 for generating two section pulses must be provided in parallel, independent of an angle signal generating toothed wheel having teeth arranged at equal angular sections and a cylinder identification toothed wheel having teeth arranged at sections of an angle obtained by dividing the crank angle of 720 degrees by the number of cylinders.

Figure 18B:
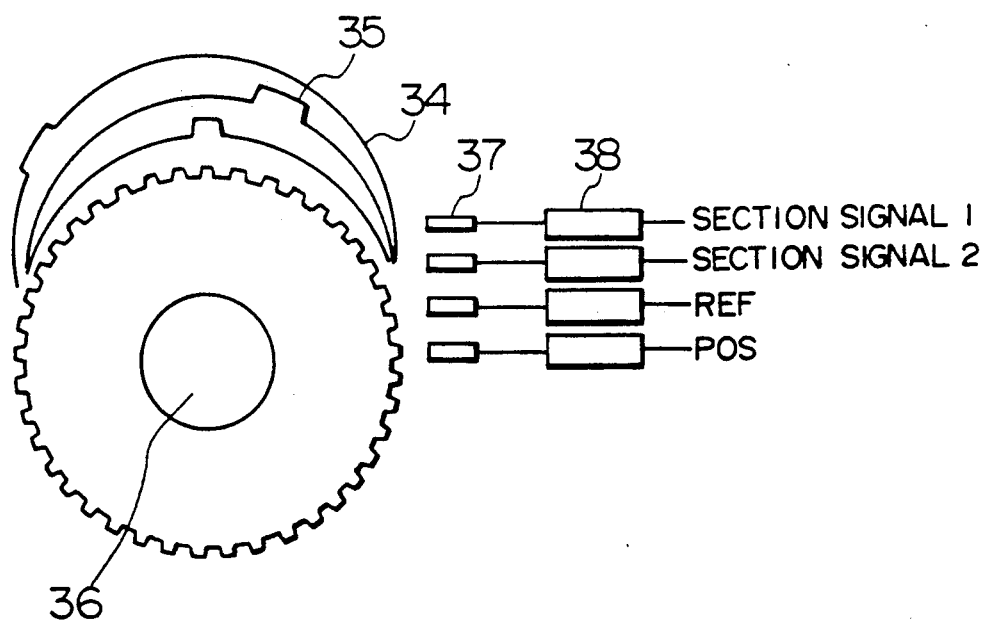

In the case where the section signals are separated from each other as shown in FIG. 18B, two toothed wheels are provided because the $U_{per}$ side section and the $L_{ower}$ side section must be detected separately by pickups.

In the case where the magnetic projections are detected by the electromagnetic pickups, the leading and trailing of the pulse waveform become dull. Accordingly, it is necessary to provide wave-shaping circuits 38 for respectively shaping up signals picked up.

When such a ring toothed wheel is provided on the crankshaft, main causes of errors, such as backlash and the like, are eliminated. Accordingly, accuracy can be improved though the section pulse width is relatively small.

Figure 19A:
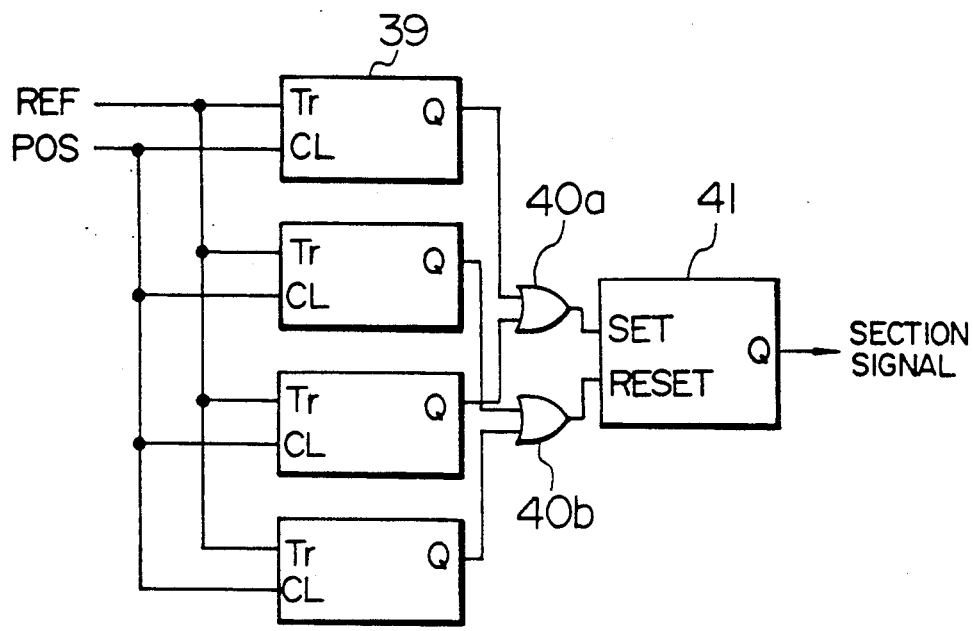
FIGS. 19A and 19B are block diagrams for explaining the signal processing portion as embodiments of the present invention.
Figure 19B:
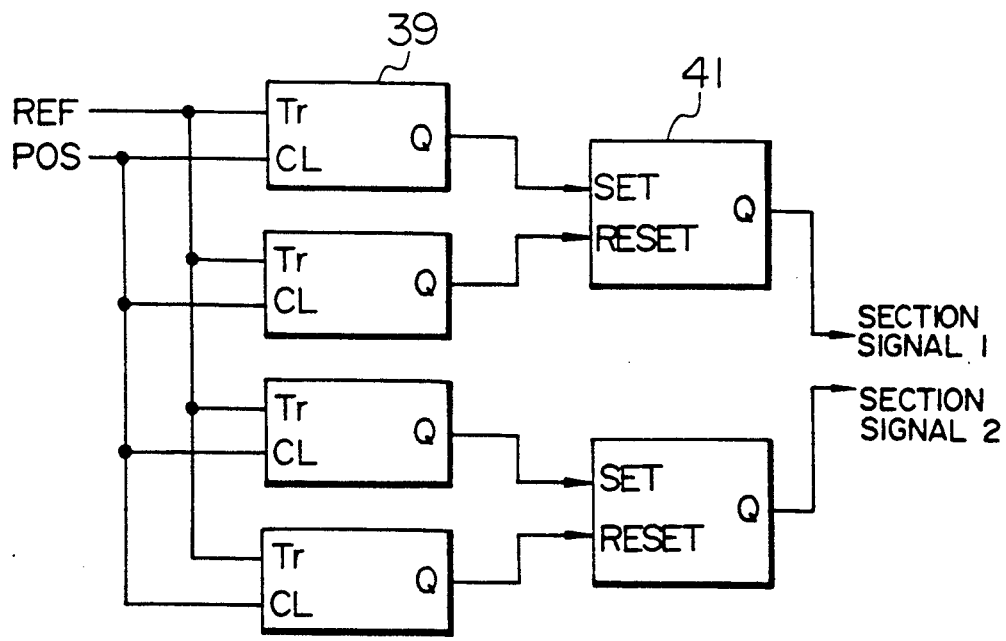

FIGS. 19A and 19B show further examples of the mechanism in which section pulse signals are generated by signal processing based on the conventional angle measurement signal $P_{os}$ and cylinder identification signal $R_{ef}$. The operation of the mechanism is as follows. The $R_{ef}$ signal generated at sections of an angle obtained by dividing the crank angle of 720 degrees by the number of cylinders is delivered to trigger input terminals of four counters 39. The $P_{os}$ signal generated at sections of an angle of about 2 degrees is delivered to clock input terminals of the counters. The counters are arranged so that pulses are generated from the counters when a predetermined angle is given. In this case, in order to generate two section pulses, it is necessary that positions in which the four counters generate signals independently can be designated. In this embodiment, the counters are constituted by four presettable counters. The four output signals of the counters are processed as follows. In the case where the section signals are put on one signal line as shown in FIG. 19A signals coming to the leading position of a section pulse are supplied to a two-input OR gate 10a connected to a set input terminal of a flip-flop (bistable) circuit 11. Signals coming to the trailing position of a section pulse are supplied to a two-input OR rate 10b connected to a reset input terminal of the flip-flop circuit 11.

In the case where the section signal is separated as shown in FIG. 19B, the circuit is configured so that the output signals of the counters are separately supplied to set input terminals and reset input terminals of two flip-flop circuits respectively. Although the aforementioned logic circuit may be provided in the control unit side, it is preferable that the circuit is provided in the crank angle sensor side because the length of the signal line ca be reduced to prevent operation errors from occurring.

What is claimed is:

1. A method of detecting the condition of combustion in each cylinder of an internal combustion engine while monitoring a variation in rotation of the crankshaft of said engine for each cylinder, in which a rotational angular acceleration within one combustion period of each cylinder is detected to judge that a predetermined cylinder is in a condition of irregular combustion when the quantity of variation in the rotational angular acceleration between adjacent cylinders exceeds a predetermined value, in which the rotational angular acceleration is obtained by dividing a difference between the values of revolution speed obtained at two points within a combustion period by the period of said one combustion period.

2. An internal combustion engine control apparatus comprising a crank angle signal generating means constituted by a first member arranged to rotate in synchronism with a crankshaft in an internal combustion engine and a second member for generating a pulse signal synchronized with the rotation of said first member, and an operational condition correcting means for correcting both the timing of ignition and the condition of fuel supply to each cylinder of said engine while detecting the condition of combustion in each cylinder of said engine based on the output of said crank angle signal generating means, in which said crank angle signal generating means includes a pulse generating means for generating two pulse signals equal in crank angle width at sections of an angle obtained by dividing the crank angle of 720 degrees by the number of cylinders of said engine, so that counters operating under the presence of the pulse signals generate output values corresponding to the revolution speed of said crankshaft corresponding to the positions of generation of said pulse signals and so that a fuel injection pulse representing at least one of the ignition timing of said engine and the fuel supply condition is changed by said operational condition correcting means.

3. In an engine control apparatus comprising various sensors including a crank angle sensor for detecting a crank angle of an internal combustion engine and an air flow sensor for measuring the quantity of suction air, and a control unit for processing signals from said sensors to thereby perform engine control, a method of detecting the condition of combustion in said internal combustion engine comprising the steps of: measuring a speed $N_{bot}$ at a defined position distant from a compression upper dead point and $N_{top}$ at a defined position distant from an explosion lower dead point based on signals from the crank angle sensor; calculating acceleration $\alpha (=N_{top}-N_{bot})$; and judging the condition of combustion in said engine based on the magnitude of the acceleration $\alpha$, in which an acceleration meter for detecting roll-direction acceleration of said engine is provided to judge the condition of combustion in said engine based on the magnitude of acceleration obtained by said acceleration meter instead of the acceleration $\alpha$ obtained based on signals from said crank angle sensor.

4. An internal combustion engine controlling method, comprising the steps of:

detecting an irregular condition of combustion in an internal combustion engine, including detecting the condition of combustion in each cylinder of the engine while monitoring a variation in rotation of the crankshaft of the engine for each cylinder, in which a rotational angular acceleration within one combustion period of each cylinder is detected to judge that a predetermined cylinder is in a condition of irregular combustion when the quantity of variation in the rotation angular acceleration between adjacent cylinders exceeds a predetermined value, wherein the rotational angular acceleration is obtained by dividing a difference between the values of revolution speed obtained at two points within a combustion period by the period of said one combustion period; and controlling at least one of ignition timing and fuel injection amount in accordance with a detected irregular condition of combustion.

5. An apparatus for detecting the condition of combustion in each cylinder of an internal combustion engine while monitoring a variation in rotation of a crankshaft of said engine for each cylinder, said apparatus comprising: a pulse generating means for generating rectangular-wave pulses having a predetermined cycle within one combustion period of each cylinder; an upper dead point side revolution speed detecting means for obtaining the revolution speed of a crankshaft just after an upper dead point of each cylinder by counting the number of output pulses of said pulse generating means within a predetermined period just after the upper dead point; a lower dead point side revolution speed detecting means for obtaining a revolution speed just before a lower dead point of the cylinder by counting the number of output pulses of said pulse generating means within a predetermined period just before the lower dead point; a rotational angular acceleration detecting gears for obtaining rotational angular acceleration within said period based on the output signals of the two revolution speed detecting means; and a discriminating means for discriminating an irregular-combustion cylinder by comparing values of rotational angular acceleration between adjacent cylinders.

6. An apparatus for detecting the condition of combustion in an internal combustion engine according to claim 5, in which said discriminating means is provided with a plurality of reference rotational angular acceleration values and has a function of judging the degree of irregular combustion based on the magnitude of a detection value.

7. In a crank angle signal generating mechanism composed of a first member which rotates in synchronism with a crankshaft in an internal combustion engine and a second member for generating a pulse signal synchronized with the rotation of said first member, a crank angle sensor for use in an apparatus for detecting the condition of combustion in said internal combustion engine, said crank angle sensor being arranged so as to generate two pulse signals equal in crank angle width at sections of an angle obtained by dividing a crank angle of 720 degrees by the number of cylinders of said engine.

8. A crank angle sensor according to claim 7, in which positions of generation of the two crank angle pulse signals are arranged opposite to each other with respect to a crank angle.

9. A crank angle sensor according to claim 7, in which positions of generation of the two crank angle pulse signals are a position where rotational angular speed is maximized and another position where rotational angular speed is minimized.

10. A crank angle sensor according to claim 7, in which said crank angle signal generating mechanism is constituted by a slit disk which makes one turn at a crank angle of 720 degrees in synchronism with said crankshaft, and a photo-interrupter for generating a pulse signal.

11. A crank angle sensor according to claim 10, in which the positions of slits of said disk for generating two crank angle pulses are provided concentrically on one and the same disk, independently of angle signal slits arranged at equal angular sections on said disk and cylinder discriminating slits arranged at sections of an angle obtained by dividing the crank angle of 720 degrees by the number of cylinders.

12. A crank angle sensor according to claim 7, in which said crank angle signal generating mechanism is constituted by a magnetic toothed wheel arranged so as to rotate in synchronism with said crankshaft, and a detecting portion of an electromagnetic pickup.

13. A crank angle sensor according to claim 12, in which the mount position of said magnetic toothed wheel (34) for generating two crank angle pulses is provided in parallel, independently of an angle signal generating toothed wheel having teeth arranged at equal angular sections and a cylinder discriminating toothed wheel having teeth arranged at sections of an angle obtained by dividing the crank angle of 720 degrees by the number of cylinders of said engine.

14. A crank angle sensor according to claim 7, in which a mechanism for generating two crank angle pulses is attained by means for performing signal processing based on an angle signal and a cylinder discrimination signal.

15. A crank angle sensor according to claim 14, in which said means for signal processing is constituted by a counter portion for counting the number of pulses in the angle signal with the cylinder discrimination signal as a trigger to generate a signal when the number of pulses reaches a predetermined value, and a flip-flop portion for generating a signal with the output signal of the counter portion as a set/reset signal.

16. In an engine control apparatus comprising various sensors including a crank angle sensor for detecting a crank angle of an internal combustion engine and an air flow sensor for measuring the quantity of suction air, and a control unit for processing signals from said sensors to thereby perform engine control, a method of detecting the condition of combustion in said internal combustion engine comprising the steps of: measuring a speed $N_{bot}$ at a defined position distant from a compression upper dead point and $N_{top}$ at a defined position distant from an explosion lower dead point based on signals from the crank angle sensor; calculating acceleration $\alpha(=N_{top}-N_{bot})$; and judging the condition of combustion in said engine based on the magnitude of the acceleration $\alpha$, in which the condition of combustion is SAID engine is judged based on the magnitude of an acceleration difference $\Delta\alpha=\alpha(n)-\alpha(n-1)$ instead of the acceleration $\alpha$.

17. A method of detecting the condition of combustion in an internal combustion engine according to claim 16, in an electromagnetic pickup is attached to a ring-like toothed wheel of a flywheel to judge the condition of combustion in said engine based on acceleration $\alpha$ and a acceleration difference $\Delta\alpha$ obtained based on signals from said electromagnetic pickup instead of signals from said crank angle sensor.

* * * * *